Sept. 15, 1964 L. B. HAIGH ETAL 3,149,203

PULSE CODE SIGNALLING SYSTEMS

Filed March 3, 1961 3 Sheets-Sheet 1

INVENTORS.
LESLIE B. HAIGH
THOMAS W. TUTTLE

BY Robert Lieber

ATTORNEY

INVENTORS.
LESLIE B. HAIGH
BY THOMAS W. TUTTLE
Robert Lieber
ATTORNEY

INVENTORS.
LESLIE B. HAIGH
BY THOMAS W. TUTTLE
Robert Lieber
ATTORNEY

United States Patent Office 3,149,203
Patented Sept. 15, 1964

3,149,203
PULSE CODE SIGNALLING SYSTEMS

Leslie B. Haigh, West Orange, and Thomas W. Tuttle, Nutley, N.J., assignors to International Telephone and Telegraph Corporation, Nutley, N.J., a corporation of Maryland Filed Mar. 3, 1961, Ser. No. 93,150
10 Claims. (Cl. 178—26)

This invention relates to pulse code signalling systems in which combinations of pulse code signal elements are forwarded sequentially from a transmitting station to one or more remote receiving stations.

The general objective herewith is to provide an arrangement for improving the utility and versatility of existing pulse code signalling facilities.

A more specific object is to provide a retiming arrangement for making more effective use of existing pulse code facilities and to improve the signal to noise transmission characteristics therein, without the use of extensive off-line storage facilities in the retiming process.

Still another object is to provide a versatile arrangement for enhancing the security of pulse code messages intended exclusively for one of a plurality of receivers connected to a common transmission line.

In a preferred arrangement all of the foregoing objects are achieved by means of transmitting and receiving converter units respectively interposed at transmitting and receiving termini of an existing pulse code transmission line. The transmitting converter operates to decrease the duration of one or more predetermined pulse code signal elements within each pulse code character signal combination of a message, and to uniformly re-apportion the resultant time decrement among the remaining elements of the character combination so as to decrease the transmission modulation rate. Accordingly, there is an increase in the duration of the shortest element of the combination, and a corresponding narrowing of the frequency spectrum of the transmitted combination. The receiving converter performs a complementary conversion in which the original element durations are substantially reinstated by means of complementary operations performed on the durations of the pulse code signal elements forwarded by the transmitting converter. Both the transmitting and receiving converters are so arranged that large capacity "off-line" storage apparatus is not required during the respective conversions, thus simplifying and minimizing the cost of the conversion apparatus.

As a result of the foregoing conversions, and the decrease in the modulation rate of signals propagating through the existing transmission line between the converters, the overall distortion of the pulse code signal combinations may be reduced. In certain instances, where the existing transmission line has deteriorated to the extent that the transmission characteristics no longer sustain the transmission of recognizable pulse code combinations at a given modulation rate, this invention may be employed to compensate for the line deterioration in lieu of a complete replacement of the deteriorated line.

As an additional and more general benefit, the transmitting and receiving converters provide modifications of the pulse code signal element durations within each code character combination, which as a security measure, establishes exclusive coupling only between those transmitters and receivers which have properly synchronized converter units associated therewith.

The foregoing and other objects and novel features of this invention as well as the invention itself, both as to the organization thereof and preferred modes of operation, may best be understood from the following detailed description presented in connection with the accompanying drawings wherein like reference numerals refer to like parts, and further in which.

Figure 1:
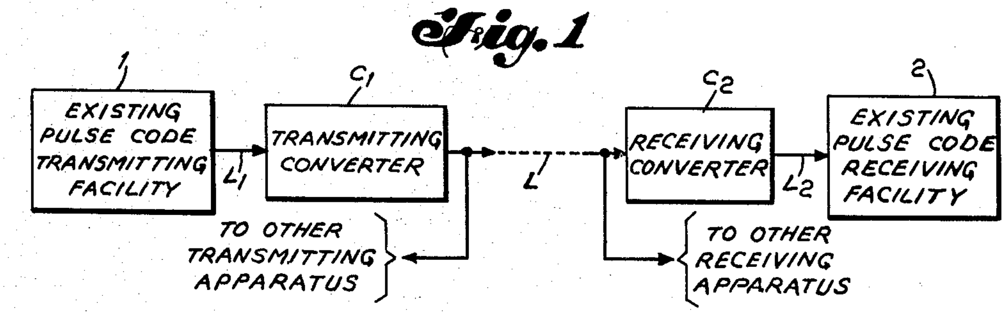
FIG. 1 is a block diagram useful in explaining the general system application of the subject invention.

Referring to FIGURE 1, a generalized arrangement of a pulse code signalling system, in accordance with this invention, includes a first station 1, at which an existing pulse code transmitting facility—such as a teleprinter tape reader, or the like—is situated. Also included is a second station 2, at which an existing pulse code receiving facility—such as a teleprinter tape perforator, page printer or the like—is situated. Stations 1 and 2 are usually remote from each other, the transmitter at station 1 ordinarily being coupled to the receiver at station 2 through an existing transmission channel L, which is a long-distance telegraph transmission line in the application associated with the preferred arrangement of FIGURE 2, but which may, in more general applications, be a radio frequency channel or other transmission coupling. In practicing the subject invention, a transmitting converter $C_1$, is introduced between the transmitter at 1 and a transmitting end terminal of the line L, and a receiving converter $C_2$ is similarly introduced between the receiver at 2, and a receiving end terminal of the line L. The connection between transmitting converter $C_1$ and the transmitter at 1, is made through a conductor designated $L_1$, and the corresponding connection of receiving converter $C_2$ is made through a conductor $L_2$.

Figure 2:
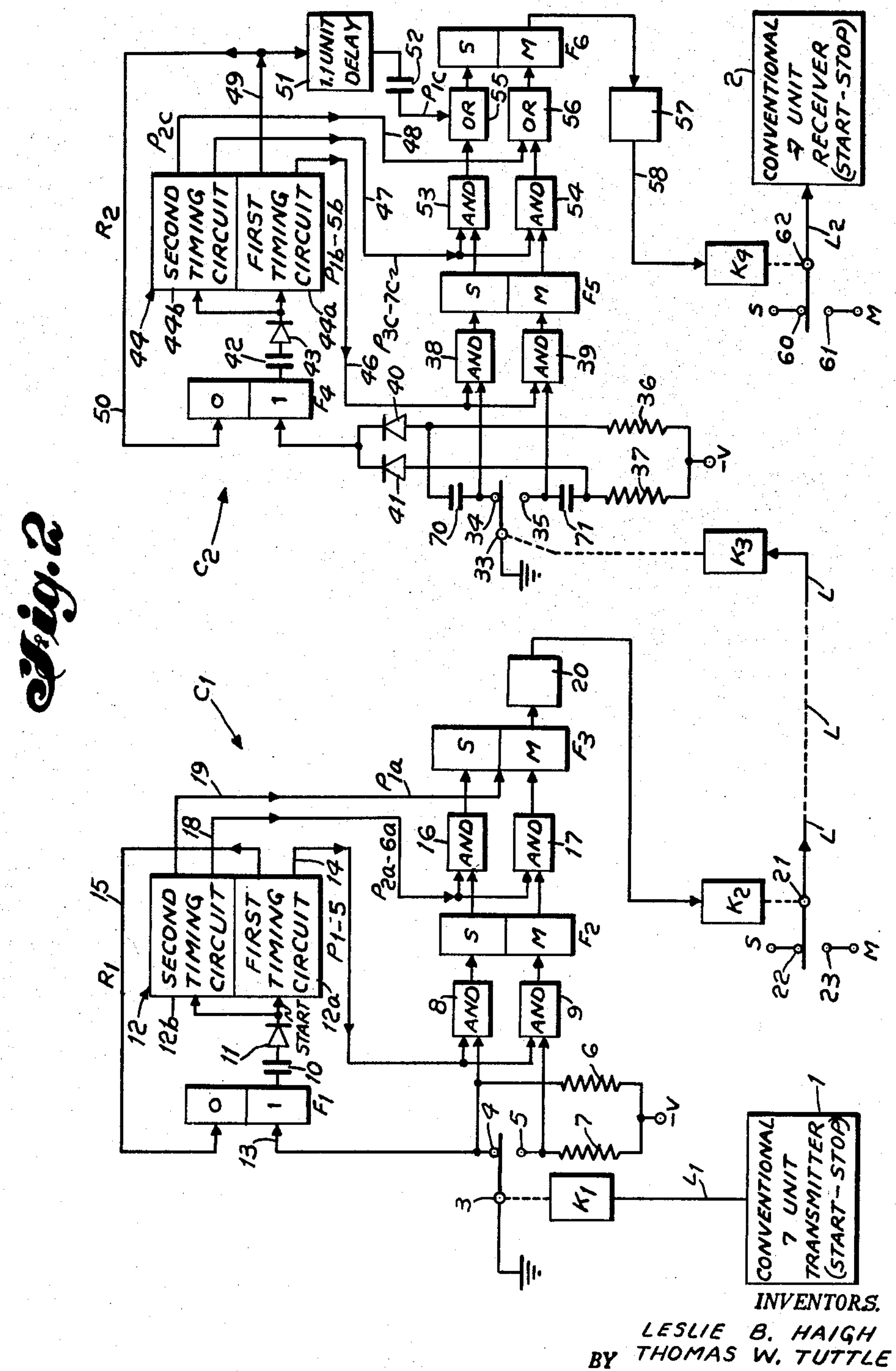
FIG. 2 is a detailed block diagram of a preferred system arranged and constructed in accordance with the teachings of this invention.

A preferred arrangement according to this invention is shown in FIGURE 2. This particular arrangement is based upon and represents an improvement and extension of the system disclosed in U.S. Patent 2,737,544 to E. P. G. Wright et al., wherein invariant stop elements of a 7-element code are discarded from the transmitted pulse code character combinations, and additional intelligence, or other signal elements are transmitted during the intervals normally occupied by the discarded elements.

The improved extension of the Wright system, as disclosed in FIGURE 2 herein, involves a unique disposition of the time interval previously occupied by the discarded stop elements. In the system of FIG. 2, the duration of each discarded stop element is equally apportioned among the remaining elements of the code character combination so as to uniformly lengthen all of the remaining elements in time and thereby decrease the signalling modulation rate associated with the shortest element. As a result, the distortion of the converted code signal combinations, after transmission through a deteriorated transmission line, will be less than that which would be experienced by the unconverted combinations in the same line. For a critical line, it is expected that the unconverted combinations would be distorted beyond recognition by the line, while the converted combinations would remain recognizable. It will subsequently be shown that the foregoing is accomplished by applicants without the intervening use of large-scale, off-line buffer storage apparatus.

Referring to FIG. 2, transmission line L is an existing long telegraph line handling teletype signals, and included in the apparatus at stations 1 and 2 are respectively existing teleprinter pulse-code transmitting and receiving devices. The transmitter at station 1 transmits intelligence—in the form of first signal combinations consisting of ordinary start-stop 7-element mark and space code character signal groups—to output conductor $L_1$ which is coupled thereto, and remains in a quiescent mark signal condition when no intelligence is being conveyed. Each 7-element code character (first signal combination) consists of a start-element which is invariably transmitted as a space signal level; 5 variable code signal elements, each of which may be selectively transmitted as a mark or space signal; and a stop element which is invariably transmitted as a mark signal level. With the exception of the stop element, all of the signal elements are of substantially equal unit time duration, and the duration of the stop element is usually equal to or 1.42 times that of the other elements, depending upon the nature of the transmitting equipment. In the preferred arrangement to be described the stop element is equal in duration to the others, but it is emphasized that this is not a necessary condition for the practice of the invention. It is also noted that so long as the levels assigned to the stop and start signal elements are selected as invariants of opposite value, the particular level assigned to each element is of no consequence.

A transmitting converter $C_1$, in accordance with this invention, is coupled between the transmitting end of the line L and the apparatus at station 1 to convert each first combination into a corresponding second combination in a manner to be described. Converter $C_1$, includes a relay $K_1$ having a control coil connected to station 1 through conductor $L_1$.

Relay $K_1$ further includes a movable contact arm 3 connected to a source of reference ground potential and stationary contact arms 4 and 5. The operation of the relay is such that movable contact 3 is in conductive contact with stationary contact 4 and out of contact with stationary contact 5, when a space signal is present on conductor $L_1$. Further, when a mark signal is present on conductor $L_1$, contact 3 is maintained in conductive contact with contact 5, and out of contact with contact 4. Thus, the signal level on conductor $L_1$ serves to establish selective contact between movable contact 3 and the stationary contacts 4 and 5 of the relay.

Stationary contacts 4 and 5 of relay $K_1$ are respectively connected, through resistors 6 and 7, to a source of potential —V, at which a negative potential, with respect to the ground potential on movable contact arm 3, is maintained, so that in either condition of operation of the relay, the stationary contacts 4 and 5 are oppositely conditioned, one to ground potential, and the other to the negative potential —V. Thus, operation of relay $K_1$, in relation to the connection of movable contact arm 3 to stationary contacts 4 and 5, in the present instance, produces a negative signal amplitude at contact 5 in conjunction with space signal inputs on conductor $L_1$, while contact 4 simultaneously resides at ground potential, and, in conjunction with mark signals on $L_1$, contact 4 is maintained at a negative potential while contact 5 is grounded.

Converter $C_1$ in FIG. 2 also includes a bistable circuit, designated flip-flop $F_1$, having associated first and second stable operating states, which, for convenience, are designated respectively "one" and "zero" states. The "one" state is established in well known fashion by positive going pulse signals on an input conductor 13, while the "zero" state is similarly established by positive going pulses on input conductor 15. Transitions between stable states of flip-flop $F_1$ occur only in conjunction with pulse signals of proper polarity on conductors 13 and 15, and then only provided that the flip-flop is respectively in the "zero" or "one" state when the respective conductors are pulsed. The operation of flip-flop $F_1$ in conjunction with the signals on conductors 13 and 15 is such that the flip-flop is conditioned to the "zero" state by a signal on conductor 15 immediately prior to the mark to space transition between stop and start signals of successive code character signal combinations, and each such mark to space transition establishes contact between contacts 3 and 4 of relay $K_1$, thus impressing a positive going pulse variation on conductor 13—which is connected to the contact 4—and thus casing the flip-flop to undergo a transition to the "one" state. This transition to the "one" state is accompanied by a positve pulse variation of predetermined polarity at the output of the flip-flop which is coupled through a capacitor 10, discriminated by a diode 11, and applied as a code character "start" signal indication to a timing means 12 coupled to the diode 11. Timing means 12 includes first and second timing circuits, 12*a* and 12*b*, respectively, which operate in response to the aforementioned positive pulse discriminated by diode 11, to produce respective first and second relatively unsynchronous timing pulse trains, each having a predetermined number of pulses.

Figure 3:
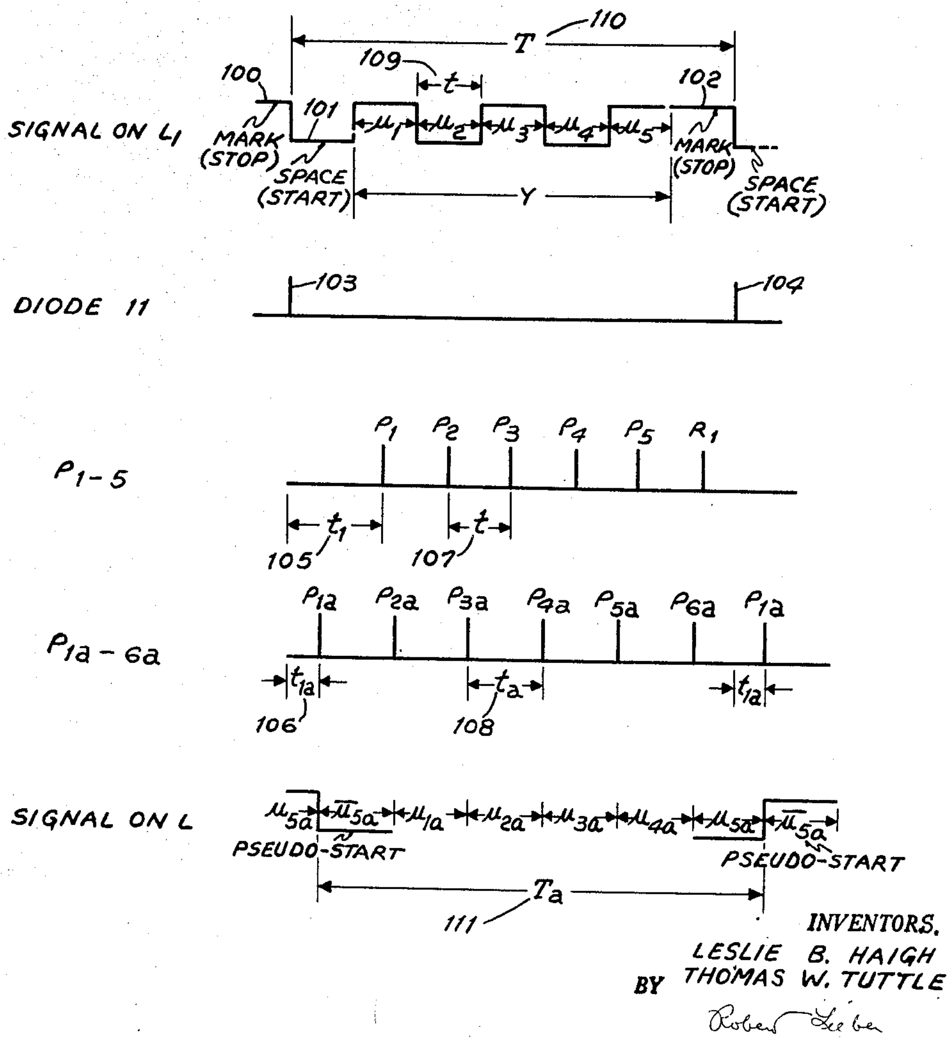
FIG. 3 is a timing diagram useful in explaining the relative timing between signals associated with the transmitting converter of FIG. 2.

The relative timing between the first and second timing pulse trains is illustrated in FIGURE 3. The first train of timing pulses consists of pulses $P_1$ throuh $P_5$ which are timed to occur at the approximate mid-points in time of the 5 variable code signal elements of the incoming first code character signal combination following the stop-to-start transition signaled by the aforementioned pulse transferred by diode 11. The second train of timing pulses consists of pulses $P_{1a}$ to $P_{6a}$ which are timed to occur at the desired instants at which signal elements of an outgoing second combination are to be initiated. Timing circuit 12*a* also operates to transfer a reset pulse $R_1$ to conductor 15. This pulse serves to reset flip-flop $F_1$ to the "zero" state at a predetermined time after the receipt of the 5 variable code elements of the first code character combination.

Referring again to FIGURE 2, timing pulses $P_1$ to $P_5$ are transferred as sampling pulses from first timing circuit 12*a*, thru conductor 14, to control coincidence gating circuits 8 and 9. Circuits 8 and 9 are respectively coupled to stationary contacts 4 and 5 of relay $K_1$. Thus pulses $P_1$ to $P_5$ serve to sample the voltages at contacts 4 and 5 of relay $K_1$ and to transfer a condition corresponding to the sampled voltages, in the form of a pulse signal which appears exclusively at the output of one of the coincidence gating circuits 8 or 9. As previously explained the sampled voltages correspond with the variable elements of the first combination. It follows that for each sampled element, a pulse is transferred to the output of circuit 8, or circuit 9, depending respectively upon whether the relay $K_1$ is in the condition corresponding to a space or a mark signal on conductor $L_1$. The outputs of coincidence circuits 8 and 9 are coupled respectively to complementary inputs of a bistable circuit $F_2$ which is conditioned to complementary space and mark conditions in conjunction with the sampled signals. Thus the sampled variable elements of the incoming first combinations are each stored in $F_2$ after a delay of approximately one-half of a variable element duration, recalling that the pulses $P_1$ to $P_5$ are timed to occur at the mid point in time of the corresponding variable elements.

The timing pulses $P_{2a}$ to $P_{6a}$ produced by the second timing circuit 12*b* are applied through a conductor 18 to control inputs of coincidence gating circuits 16 and 17 which also receive outputs of flip-flop $F_2$ respectively indicative of the space and mark conditions of said flip-flop. The outputs of coincidence circuits 16 and 17 are connected to respective space and mark conditioning inputs of a single stage binary counting circuit $F_3$, and are used to unsymmetrically trigger the circuit in accordance with the teachings in paragraphs 5–7 and 11–3, and in FIGURE 11–3 of J. Millman and H. Taub "Pulse and Digital Circuits."

The timing pulse $P_{1a}$ produced by timing circuit 12*b* is applied thru conductor 19 to a symmetrical triggering input of counting circuit $F_3$, so as to reverse the condition of the circuit in conjunction with the pulse $P_{1a}$ regardless of the previous condition of the circuit. A bistable voltage output is taken from circuit $F_3$ and applied, through isolating amplifier 20, to the control coil of a relay $K_2$ having a movable contact 21, which is connected to either a stationary contact 22, or to a stationary contact 23, depending upon the condition of the relay. Movable contact 21 is permanently connected to a transmitting end terminal of the long telegraph line L, while stationary contact 22 and 23, are respectively connected to sources of space and mark signal potentials, which are thus selectively impressed on the line L in accordance with the output of circuit $F_3$.

Referring to FIGURE 3, the overall operation of converter $C_1$ is to accept first binary code signal combinations, each having an overall duration T—as indicated at 110—and each consisting exclusively of a start signal element selected as an invariant space signal—as at 101—5 variable code character signal elements $U_1$ to $U_5$, and a stop signal element which is invariably selected as the binary complement of the start signal element—as indicated by the mark condition at 102. In the particular illustration, the signal sequence $U_1$ to $U_5$ is shown by way of example as the sequence mark, space, mark, space, mark, this corresponding to the letter Y in conventional international teletype codes, as is well known to those skilled in the telegraph arts. The start element and the variable elements are all of equal duration *t*—as indicated at 109—while the stop element duration is either equal to or 1.42 times *t*, depending upon the apparatus at station 1. By convention, the interval, if any, between transmitted code characters on line $L_1$ of FIG. 2, is occupied by a mark signal extension of the stop unit.

The output of diode 11 is a positive pulse—which, as indicated at 104, occurs in coincidence with the stop-to-start signal level transition between the received first combination and the immediately succeeding first combination as indicated at 103, or it occurs in coincidence with the stop to start transition between the immediately preceding first combination and that being received.

After a predetermined time $t_1$ following the diode detected pulse indicated at 103, the first pulse $P_1$, of the first train of timing pulses $P_1$ to $P_5$, is produced. The time interval $t_1$ is indicated at 105. After the pulse $P_1$, the pulses $P_2$ through $P_5$ follow at equal intervals *t*, as indicated at 107. The pulse $R_1$ is timed to occur after a predetermined time, following the pulse $P_5$, of such duration that the pulse $R_1$ cannot occur prior to initiation of the stop element at 102, but must occur prior to initiation of the following start element associated with the pulse at 104 (thus resetting flip-flop $F_1$, of FIG. 1, after receipt of the stop element but prior to the following stop-to-start transition). Where the stop element duration is equal to *t* and code character combinations are transmitted without pause at intervals T, the interval *t* is equal to one-seventh of the character duration T.

Similarly, with reference to the stop-start pulse at 103, the pulse $P_{1a}$ follows after a predetermined time $t_{1a}$ as at 106, while the other pulses $P_{2a}$ to $P_{6a}$ produced by the second timing circuit of $C_1$, follow at equal intervals $t_a$, as at 108. Coincident with pulses $P_{2a}$ to $P_{5a}$, converted code signal units $U_{1a}$ to $U_{5a}$—of the converted second combination derived from the received first combination—are initiated on transmission line L. The code signal element transmitted between intelligence elements $U_{1a}$ and $U_{5a}$ of successive code character combinations, is identified as a pseudo-start element $\overline{U_{5a}}$, the overscoring serving to indicate that the element value is the complement (mark or space) of that of the preceding element $U_{5a}$ (space or mark). The duration of the converted second combination is indicated as $T_a$ at 111. By inspection, it can be seen that $T_a$ is substantially equal to T, and *ta* is approximately one-sixth of $T_a$, or, equivalently:

$$ta=\frac{1}{6}Ta=\frac{1}{6}T=\frac{1}{6}(7t)=\frac{7t}{6} \qquad (1)$$

Equation 1 thus serves to indicate the extended durations of the intelligence elements of the second combinations, within the fixed duration intervals assigned to the combinations.

Referring again to FIGURE 2, at the receiving end of line L, a converter $C_2$ is introduced between the line L and receiving station 2, to perform a complementary conversion restoring the received second combinations into third combinations substantially identical to the first combinations on line $L_1$, so as to enable the existing reception apparatus at station 2 to function without further modification. Converter $C_2$ includes a relay $K_3$ having a control coil coupled to line L and a movable grounded contact arm 33 selectively connectable to stationary contacts 34 or 35 depending upon the electrical condition of the control coil. Contacts 34 and 35 are respectively connected to a source of potential, $-V$ volts with respect to ground, through first and second differentiating networks. The first network comprises capacitor 70 and resistor 36, while the second network includes capacitor 71 and resistor 37. Contacts 34 and 35 are also directly connected to signal inputs of respective coincidence circuits 38 and 39 which, in response to sampling pulses on a control conductor 46, transfer a pulse output from that one of the circuits which is coupled to the relatively positive contact. Further, contacts 34 and 35 are coupled in common thru respective diodes 40 and 41 to a "one" state conditioning input of a flip-flop $F_4$ which functions in the same sense as flip-flop $F_1$. The diodes serve to detect the presence of either a mark-to-space or a space-to-mark transition—between the last variable element $U_{5a}$ of a converted second code signal combination received on line L and the pseudo-start element $\overline{U_{5a}}$, of the immediately following second combination—and to transfer a pulse of predetermined polarity through conductor 13' in conjunction with each such transition. The output of flip-flop $F_4$ is coupled through capacitor 42 and diode 43, to timing circuits **44*a* and 44*b* of a timing means 44. Timing circuits 44*a* and 44*b*, produce respective first and second timing pulse trains, circuit 44*a* also delivering an additional timed pulse to output conductor 50 which is fed back to the "zero" input of flip-flop $F_4$ to reset the flip-flop to its "zero" state. Thus, prior to each incoming pseudo-start pulse transition, flip-flop $F_4$ resides in the "zero" state, so that when the pseudo-start transition is transferred through diode 40 or 41, the flip-flop is triggered to the "one" state, and a start reference pulse is coincidentally transferred to timing circuits 44*a* and 44*b***.

Figure 4:
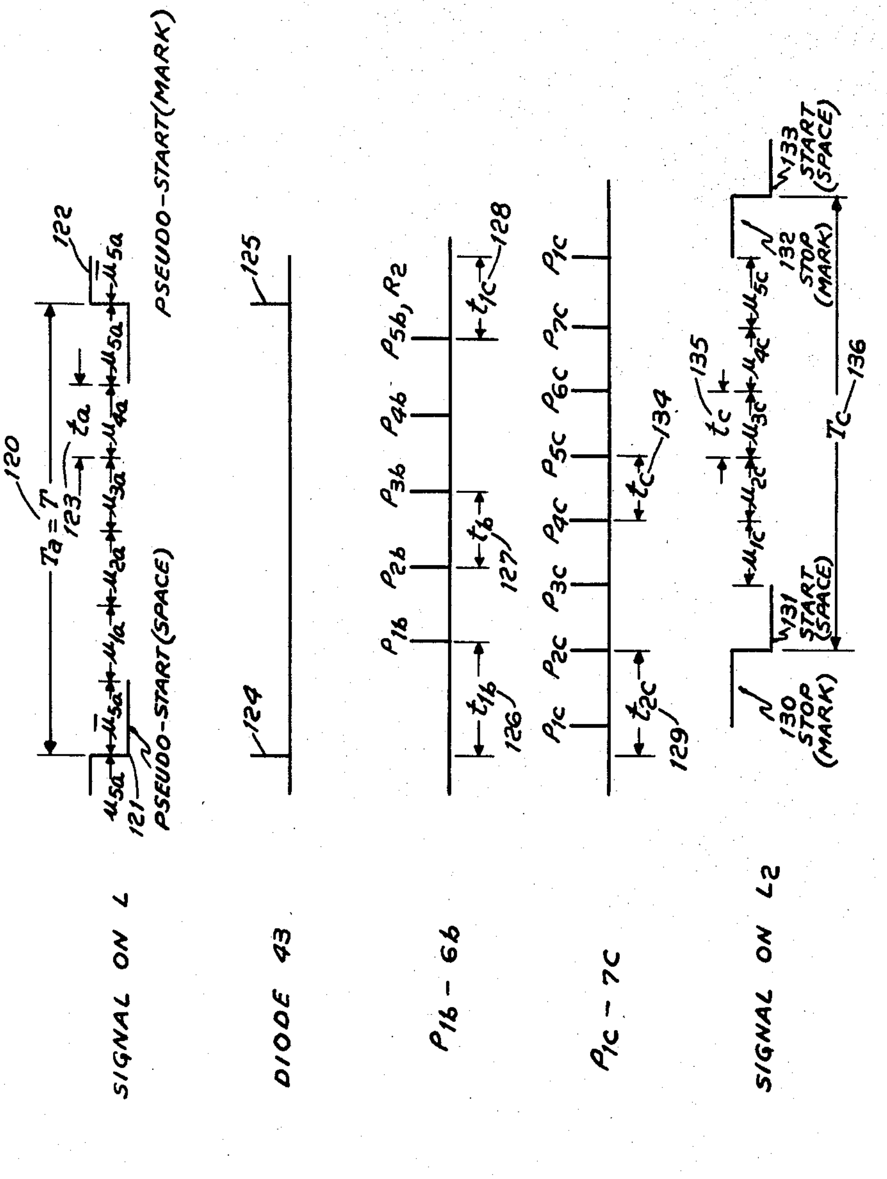
FIG. 4 is a timing diagram useful in explaining the relations between signals associated with the receiving converter of FIG. 2.

Referring to FIG. 4, the second signal combinations transferred from line L to converter $C_2$ are as previously indicated, 6-element combinations of overall duration $Ta=T$, as indicated at 120. Each combination consisting of a pseudo-start signal $\overline{U_{5a}}$, which is the complement of the immediately preceding variable element $U_{5a}$, and 5 permutable elements $U_{1a}$ through $U_{5a}$. Where the combinations are transmitted successively without pause, all elements are of equal duration, $$ta=\frac{1}{6}Ta$$

a typical interval being indicated at 123. Where there is a pause between the transmission of successive second combinations, the sixth element $U_{5a}$ is extended for the duration of the pause. The pulse outputs of diode 43 occur in coincidence with the transitions between the successive units $U_{5a}$ and $\overline{U_{5a}}$, as indicated at 124 and 125.

At a predetermined time $t_{1b}$, after each output of diode 43, the first timing circuit **44*a* of FIG. 2 delivers a first sampling pulse $P_{1b}$ to an output conductor 46**, and thereafter at substantially equal intervals of duration *tb*—which is substantially equal to *ta*—sampling pulses $P_{2b}$ through $P_{5b}$ are consecutively impressed on conductor 46. A pulse $R_2$ coincident with pulse $P_{5b}$ is applied as a reset pulse to flip-flop $F_4$ through conductor 50. The pulses $P_{1b}$ through $P_{5b}$ inclusive are timed to occur at the approximate mid-points in time of the elements $U_{1a}$ through $U_{5a}$, respectively.

Referring again to FIG. 2, the pulses $P_{1b}$ to $P_{5b}$ sample the condition of relay $K_3$ and transfer the sampled conditions as pulses through an exclusive one of the coincidense gating circuits 38 or 39. The outputs of circuits 38 and 39 are coupled to respective space and mark conditioning inputs of a flip-flop $F_5$ to condition the flip-flop in accordance with the values of the sampled elements $U_{1a}$ to $U_{5a}$.

Referring again to FIG. 4, at a predetermined time $t_{1c}$ after each pulse $P_{5b}$, a pulse $P_{1c}$ is generated. Further, at a predetermined time $t_{2c}$ following each output of diode 43, a pulse $P_{2c}$ is generated and this pulse is followed consecutively at equal intervals $t_c$, by five pulses, $P_{3c}$ through $P_{7c}$, inclusive. Duration $t_{1c}$ is approximately equal to 1.1 $t_b$=1.1 $t_a$, and the duration $t_c$ is substantially equal to the original duration $t$, of the units of the first signal combinations on conductor $L_1$.

Referring to FIG. 2, the pulses $P_{1c}$ are derived from the reset pulses $R_2$ (which, as indicated, are coincident with the pulses $P_{5b}$) through a 1.1 code element time unit delay, 51. The pulse $P_{2c}$ is produced by second timing circuit 44*b* on output conductor 48, thereof, while the pulses $P_{3c}$ to $P_{7c}$ inclusive are impressed consecutively on output conductor 47 of second timing circuit 44*b*. The signals on conductor 47 are applied as sampling pulses to coincidence gating circuits 53 and 54 which receive outputs respectively indicative of the space and mark conditions of flip-flop $F_5$. The outputs of coincidence circuits 53 and 54 are coupled to inputs of Or-circuits 55 and 56 respectively. Or-circuit 55 also receives the timing pulse $P_{1c}$, while Or-circuit 56 receives the timing pulse $P_{2c}$ as a second input. The outputs of Or-circuits 55 and 56 are applied to respective space and mark inputs of a flip-flop $F_6$. The output of flip-flop $F_6$ is applied through an isolating amplifier 57 to the control coil of a relay $K_4$ having associated stationary contacts 60 and 61 which make selective contact with an associated movable contact 62 in accordance with the condition of flip-flop $F_6$. Stationary contacts 60 and 61 are respectively coupled to sources of space and mark signalling potentials, while movable contact 62 is coupled through a conductor L2, to the existing receiving apparatus at station 2.

In operation, converter $C_2$ receives the six-element second combinations through relay $K_3$ by detecting each initiation of a pseudo-start element following the resetting of flip-flop $F_4$ by the pulse $R_2$ on conductor 50. For each such detected initiation, a pulse transferred through diode 43 initiates the production of first and second timing pulse trains by timing circuits 44*a* and 44*b*, respectively. The first train includes pulses $P_{1b}$ through $P_{5b}$ which are used to sample the corresponding elements $U_{1a}$ through $U_{5a}$ of the second combination initiated by the pseudo-start signal $\overline{U_{5a}}$. The sampled elements are stored sequentially in flip-flop $F_5$. The second timing pulse train comprises pulses $P_{2c}$ through $P_{7c}$. Pulses $P_{3c}$ through $P_{7c}$ are used to sample the conditions of flip-flop $F_5$, through coincidence circuits 53 and 54 at times synchronous with both the spacing of signal elements in a 7-element code, and the storage of the appropriate element levels in the flip-flop. The sampled conditions of flip-flop $F_5$ are transferred through Or-circuits 55 and 56 and stored in flip-flop $F_6$. In addition, pulse $P_{2c}$ serves to establish an invariant mark condition in flip-flop $F_6$ which is associated with an invariant space condition on conductor $L_2$ and which represents the ordinary start-element of the conventional 7-element code. Furthermore, at a predetermined time after the fifth incoming intelligence element is stored in flip-flop $F_5$, a timing pulse $P_{1c}$, derived through delay 51 from the reset pulse $R_2$ transfers an invariant space condition to flip-flop $F_6$ resulting in an invariant mark condition on line $L_2$, this corresponding to the stop element required in the ordinary 7-element code, and the reconversion is then complete.

The flip-flops, the coincidence gating (And) circuits, and the Or-circuits, of converters $C_1$ and $C_2$, are conventional circuits well known to those skilled in the telecommunication switching arts and well-described in the literature thereof. The timing means 12 and 44 are each simply comprised of first and second predetermined pulse signalling units, each unit being readily realized by combining the lagging edge outputs of an appropriate plurality of conventional monostable multivibrators having predetermined different circuit time constants.

It has thus been shown that 7-element code combinations can be directly converted to 6-unit combinations of the same overall duration so as to improve the fidelity of transmission by reducing the transmission modulation rate. This has been accomplished by dropping one signal element of the 7-element code in accordance with the teachings of the aforementioned Wright patent, and concurrently apportioning the duration of the dropped element equally among all of the six remaining elements by timing the selection of the remaining elements in accordance with the present invention. The reapportioning technique thus disclosed is readily extensible to perform the conversion of 7.42 time unit code combinations to 7 time unit code combinations of equal overall duration, and with *no* change in element signal conditions required as in the production of the pseudo-start element of the Wright patent. Finally, it should be noted that the subject technique is readily extensible to cover all such code conversions wherein the overall code combination duration is unmodified while the durations of individual elements are permuted, the associated general advantage residing in the provision of a more versatile communication system.

There will now be obvious to those skilled in the art many modifications and variations utilizing the principles set forth, and yet not departing from the spirit of the invention.

We claim:

1. A pulse code signalling speed converter comprising means for receiving trains of first pulse code signal combinations, said first combinations each including a first predetermined number of pulse code signal elements each of predetermined duration, means for converting each said first signal combination as it is received, element by element, into a second signal combination of substantially the same overall duration as said first combination and including a second predetermined number of pulse code signal unit elements corresponding to but differing in duration from given ones of said elements of said first combination, and means for utilizing said second combinations.

2. A pulse code signalling speed converter according to claim 1, wherein at least two of said signal elements included in said first combination are of unequal durations, while all of said plurality of elements of said corresponding second combination are substantially equal in duration.

3. A pulse code signalling speed converter according to claim 2, wherein all but one of said elements included in said first combination are of substantially equal duration, and said one element is greater in duration than said elements of equal duration.

4. A pulse code signalling speed converter according to claim 1, wherein all of said signal elements included in said first combination are of substantially equal duration and at least two of said plurality of elements of said corresponding second combination are of unequal duration.

5. A pulse code signalling speed converter according to claim 4, wherein all but one of said elements of said second combination are of equal duration and said one element is of a duration greater than said elements of equal duration.

6. A signalling speed converter for pulse code signals comprising means for receiving trains of first pulse code signal combinations, each including a predetermined plurality of signal elements of predetermined duration, means coupled to said receiving means for detecting predetermined signal level variations between successive signal elements of said first combinations, timing means coupled to said detecting means and responsive to each said detected variation to produce first and second different groups of timing pulses of approximately equal group duration, first selecting means coupled to said receiving means and said timing means for selecting said plurality of signal elements of each said first combination in synchronism with said first group of timing pulses, first storage means coupled to said first selecting means for storing said selected elements, second selecting means coupled to said first storage means and said timing means for selecting said stored signals in synchronism with given ones of said pulses in said second group of timing pulses, second storage means coupled to said second selecting means for storing said signals selected by said second selecting means, third selecting means coupled between said timing means and said second storage means for establishing a predetermined condition in said second storage means in response to said pulses other than said given ones of said second group of timing pulses, and means coupled to said second storage means for utilizing the output thereof.

7. A transmitting converter according to claim 6, wherein said adjacent signal elements are respective stop and start units of successive ones of said first signal combinations, said second storage means includes a bistable circuit and said predetermined condition established by third selecting means in said second storage means comprises a reversal in the stable condition of said bistable circuit.

8. A receiving converter according to claim 6, wherein said elements of each said first combination are all of substantially equal duration, said second storage means is a bistable circuit, and said predetermined condition established by said third selecting means is a predetermined one of the stable conditions of said bistable circuit.

9. A pulse code signalling system comprising means for transmitting trains of first pulse code signal combinations, each said first combination including a plurality of pulse code signal elements of predetermined duration, a transmitting converter coupled to said transmitting means for converting each said first combination into a different second combination of substantially the same duration as said first combination, said different second combination including a different plurality of pulse code elements corresponding to elements of said first combination but differing therefrom in duration, a remote receiving converter coupled to said transmitting converter for converting each said different second combination into a third pulse code signal combination substantially identical to said corresponding first combination, and utilization means coupled to said receiving converter for utilizing said third combinations.

10. A pulse code signalling system comprising means for transmitting first pulse code signal combinations, each said first combination consisting exclusively of a start signal element, a predetermined number of variable code signal elements and a stop signal element opposite in value to said start signal element, a transmitting converter coupled to said transmitting means for converting each said first pulse code signal combination into a corresponding second pulse code signal combination of substantially the same overall duration as said first combination, said second combination consisting exclusively of a pseudo-start signal element and a predetermined number of variable code elements equal in number and value to said variable elements of said first combination, said pseudo-start signal element and said variable elements of said second combination all having substantially equal durations, a transmission line coupled to said transmitting converter for conveying said second pulse code combinations to a remote point, a receiving converter coupled to said transmission line at said remote point for converting each said second pulse code combination into a third pulse code combination substantially identical to said corresponding first combination, and receiving means coupled to said receiving converter for receiving said third combinations.

References Cited in the file of this patent

UNITED STATES PATENTS

| | | |
|---|---|---|
| 2,643,291 | Potts | June 23, 1953 |
| 2,744,955 | Canfora et al. | May 8, 1956 |
| 2,966,546 | Wilder et al. | Dec. 27, 1960 |